US011466938B2

(12) United States Patent
Biörklund et al.

(10) Patent No.: US 11,466,938 B2
(45) Date of Patent: Oct. 11, 2022

(54) ROTATING HEAT EXCHANGER WITH IMPROVED HEAT TRANSFER EFFICIENCY (71) Applicant: FLEXIT SVERIGE AB, Töcksfors (SE)

(72) Inventors: Staffan Biörklund, Gunnarskog (SE); Anneli Halfvardsson, Töcksfors (SE); Peng Liu, Trondheim (NO)

(73) Assignee: FLEXIT SVERIGE AB, Tocksfors (SE)

( * ) Notice: Subject to any disclaimer, the term of this patent is extended or adjusted under 35 U.S.C. 154(b) by 0 days.

(21) Appl. No.: 16/755,357

(22) PCT Filed: Oct. 9, 2018

(86) PCT No.: PCT/EP2018/077469
§ 371 (c)(1),
(2) Date: Apr. 10, 2020

(87) PCT Pub. No.: WO2019/072843
PCT Pub. Date: Apr. 18, 2019

(65) Prior Publication Data
US 2021/0123628 A1    Apr. 29, 2021

(30) Foreign Application Priority Data

Oct. 13, 2017  (SE) .................................... 1751279-9

(51) Int. Cl.
*F28D 19/04*    (2006.01)
*F28D 11/02*    (2006.01)
(Continued)

(52) U.S. Cl.
CPC .......... *F28D 19/042* (2013.01); *F24F 12/006* (2013.01); *F28D 11/02* (2013.01);
(Continued)

(58) Field of Classification Search
CPC .... F24F 7/04; F24F 12/006; F24F 2203/1008; F24F 2203/104; F24F 2203/1048;
(Continued)

(56) References Cited

U.S. PATENT DOCUMENTS 3,183,963 A    5/1965  Mondt
3,367,406 A *  2/1968  Gerbenvonk ........... F28D 17/02
                                                             165/10
(Continued)

OTHER PUBLICATIONS

The Engineering Toolbox, "Thermal Conductivity of Meals, Metallic Elements and Alloys," https://www.engineeringtoolbox.com/thermal-conductivity-metals-d_858.html (Accesed Jul. 1, 2021) (Year: 2021).*

(Continued)

*Primary Examiner* — Eric S Ruppert
*Assistant Examiner* — Hans R Weiland
(74) *Attorney, Agent, or Firm* — Vierra Magen Marcus LLP (57) ABSTRACT The disclosure relates to a heat transfer assembly for a rotary regenerative heat exchanger. The assembly includes a rotor arranged between at least two separated fluid flow passages passing flow axially through the rotor, where each flow passage is connected to a sector part of the rotor. The assembly further includes a plurality of channels in the rotor for flowing a fluid through the rotor, each of the channels is enclosed by heat transfer and heat accumulating surfaces in the rotor, and the heat transfer and heat accumulating surfaces of the channels are made in a material providing an average axial thermal conductivity less than 100 W/mK arranged to reduce the Longitudinal Heat Conductivity of the rotor.

19 Claims, 7 Drawing Sheets

(51) Int. Cl.
  *F28F 13/14* (2006.01)
  *F28F 21/06* (2006.01)
  *F28F 21/08* (2006.01)
  *F24F 12/00* (2006.01)
  *F28F 13/08* (2006.01)

(52) U.S. Cl.
  CPC ............ *F28D 19/044* (2013.01); *F28F 13/08* (2013.01); *F28F 13/14* (2013.01); *F28F 21/063* (2013.01); *F28F 21/066* (2013.01); *F28F 21/081* (2013.01); *F24F 2203/104* (2013.01); *F24F 2203/1008* (2013.01); *F24F 2203/108* (2013.01); *F24F 2203/1048* (2013.01); *F24F 2203/1068* (2013.01); *F28F 2270/00* (2013.01)

(58) Field of Classification Search
  CPC ....... F24F 2203/1068; F24F 2203/1072; F24F 2203/1076; F24F 2203/108; F24F 2203/1084; F24F 2203/1088; F24F 2203/1092; F28D 11/02; F28D 19/042; F28D 19/044; F28F 13/08; F28F 13/14; F28F 21/063; F28F 21/066; F28F 21/081
  See application file for complete search history.

(56) References Cited

U.S. PATENT DOCUMENTS

| | | | | |
|---|---|---|---|---|
| 3,965,695 | A * | 6/1976 | Rush | ..................... F28D 19/042 62/271 |
| 4,200,441 | A | 4/1980 | Honmann et al. | |
| 4,381,815 | A | 5/1983 | Frost et al. | |
| 4,594,860 | A * | 6/1986 | Goellner | ................ F24F 3/1423 165/10 |
| 4,953,627 | A | 9/1990 | Ito et al. | |
| 5,514,035 | A * | 5/1996 | Denniston | ............. F24F 3/1423 454/121 |
| 5,771,707 | A * | 6/1998 | Lagace | .................. F28D 19/042 165/8 |
| 6,408,932 | B1 * | 6/2002 | Steele | ................... F24F 3/1423 165/10 |
| 7,114,549 | B2 * | 10/2006 | Mitchell | ................. F28D 17/02 165/4 |
| 2010/0147499 | A1 * | 6/2010 | Arai | ...................... F24F 12/006 165/172 |
| 2012/0255702 | A1 * | 10/2012 | Lee | ....................... F28D 19/041 165/8 |
| 2014/0352345 | A1 * | 12/2014 | Hakbijl | ................. F28D 19/042 62/314 |
| 2017/0198981 | A1 | 7/2017 | Schlipf et al. | |
| 2018/0216897 | A1 * | 8/2018 | Robinson | ............. F28D 19/042 |

OTHER PUBLICATIONS

PCT/EP2018/077469—International Search Report dated Mar. 12, 2018, 11 pages.
Communication pursuant to Article 94(3) EPC dated Feb. 19, 2021 in European Patent Application No. 18786709.8.
Communication pursuant to Article 94(3) EPC dated Sep. 24, 2021 in European Patent Application No. 18786709.8.

* cited by examiner

ROTATING HEAT EXCHANGER WITH IMPROVED HEAT TRANSFER EFFICIENCY

CLAIM FOR PRIORITY

This application claims the benefit of priority to PCT/EP2018/077469, filed Oct. 9, 2018, which claims the benefit of priority to EP1751279-9, filed Oct. 13, 2017, the entire contents of which are hereby incorporated by reference.

BACKGROUND OF THE DISCLOSURE

The present disclosure relates to a rotary heat exchanger and ways to improve the heat transfer efficiency between the used air and the fresh air passing through the rotary heat exchanger.

Rotary heat exchangers has been used since decades in climate systems where old air is ventilated off and replaced with fresh outdoor air. The rotatory heat exchanger is connected such that about 50% of the rotor body is exposed to flow of old air (extract air) and the other 50% of the rotor body is exposed to flow of fresh (outdoor air) air. Heat caught in the rotor in one half is transferred to the other flow by rotation of the rotor body.

The main approaches used when trying to improve heat transfer capacity involves manufacturing of heat exchanging rotor bodies with a multiple of narrow channels, where the channels may have elements or protrusions that cause turbulence in the narrow channels. Disturbing the stationary layer over a heat transfer surface improves heat transfer from the passing air flow stream to the heat transfer surface.

U.S. Pat. No. 6,892,795 discloses such a solution where the narrow channels are made by winding strips of high molecular weight polymer provided with a first set of primary embossments with a length corresponding to the length of the rotor, and with secondary shorter embossments arranged in rows between the first embossments.

In U.S. Pat. No. 6,179,276 is shown another example where a number of V-shaped ribs are formed in the heat transfer and heat accumulating surfaces orthogonally to flow direction in order to generate turbulence in the flow direction over the heat transfer surface.

Several proposals on how to produce these narrow channels by winding corrugated foils into a rotor has been presented.

U.S. Pat. No. 4,769,053 discloses such a winding method, where the foil may be a metal foil in aluminum or stainless-steel material, but also foils may be produced in kraft paper, nylon fiber paper, mineral fiber paper, asbestos, and plastic.

U.S. Pat. No. 4,200,441 discloses another winding method where the foil is made from corrugated strips, where the heat exchange is improved by an open communication between channels in neighboring layers, resulting in undesired leakage.

Other solutions for improved heat exchange use different materials in order to optimize either heat transfer of latent heat or heat transfer of sensible heat, or both in the same rotor. The latent heat is stored as moisture, and the heat transfer and heat accumulating surfaces in such latent heat storage are often hygroscopic, while the sensible heat is strictly absorbed by conductivity in the heat transfer and heat accumulating surfaces.

US40351712 discloses a rotor having very small channels, i.e. less than 0.005 $cm^2$, wherein a thin hygroscopic surface layer, 1 to 10 microns, is arranged to provide a desired humidity transfer and to serve as a bonding agent for holding together the rotor.

US2012255702 discloses a sensible heat exchanging rotor having a lighter weight than the conventional one, by means of using polymer material for the heat storage medium and suggests molding a rotor having very large channels, i.e. larger than 0.2 $cm^2$. A similar design is also known from DE2414663.

U.S. Pat. No. 5,771,707 discloses a heat exchange rotor with one rotor with a first axial rotor part having an air-to-air water vapor transfer rotor part, i.e., latent heat recovery, and a second axial rotor part for air-to-air heat transfer rotor part, i.e. sensible heat recovery.

U.S. Pat. No. 5,937,933 discloses another embodiment with different latent heat and sensible heat recovery heat transfer and heat accumulating surfaces, and in this case with exchangeable sector segments of the rotor.

Energy conservation is of outmost concern in the design of air ventilation systems. There is an endless need to reduce energy losses in ventilation systems further. When operating ventilation systems in winter climate, venting off old hotter air and replacing this air volume with often colder fresh ambient air, and with heat exchange between these air flows could heating needs be reduced considerably. When operating ventilation systems in summer climate, venting off old chilled air and replacing this air volume with often warmer fresh ambient air, and with heat exchange between these air flows could cooling needs be reduced considerably.

SUMMARY OF THE DISCLOSURE

The disclosure is related to a surprising finding that the heat transfer efficiency in a rotating heat exchanger may be improved considerably if the Longitudinal Heat Conductivity (abbreviated by LHC in following, parts) in the heat transfer and heat accumulating surfaces of the rotor is reduced. By LHC is meant the heat conductivity in the direction of air flow over the heat transfer and heat accumulating surfaces.

Tests indicate that the surprising finding, related to the limited heat transfer in the axial direction of the heat absorbing material as such, relates to that once heat has been transferred from air flow to first exposed areas of heat absorbing material, heat transfer and heat accumulating surfaces are enabled to maintain higher heat absorption capacity.

In following parts are referred to heat transfer and heat accumulating surfaces made in a heat absorbent material with a low thermal conductivity, i.e. preferably less than 10 W/mK that advantageously may be used to achieve the object of the disclosure. Further, the surfaces of the channels have no or very low hygroscopic capacity, e.g. providing a moist absorption or adsorption of less than 1%. Accordingly, there are used materials with low thermal conductivity, such as polymers (providing thermal conductivity less than 1 $W/mK^-$), to achieve LHC reduction. Typical values for some construction polymers are;

Polyethylene (PET): Thermal conductivity in the range 0.33-0.51 W/mK

Polyester: Thermal conductivity of about 0.05 W/mK

Rubber and neoprene: Thermal conductivity in the range 0.05-0.16 W/mK

Polyamide (PA): Thermal conductivity in the range 0.24-0.28 W/mK

Cellulose Acetate (CA): Thermal conductivity in the range 0.16-0.36 W/mK.

Polycarbonate (PC): Thermal conductivity in the range 0.19-0.22 W/mK

Polyethylene (LDPE/HDPE): Thermal conductivity in the range 0.33-0.52 W/mK

Polypropylene (PP): Thermal conductivity in the range 0.1-0.22 W/mK

Polystyrene (PS); Thermal conductivity about 0.17 W/mK.

An alternative low thermal conductivity material may be air or void volumes, that has a thermal conductivity in the range 0.0243-0.0314 W/mK in the temperature range 0-100° C.

Above values of heat conductivity may be compared with the conventionally used materials in heat exchangers with high thermal conductivity, such as:

Aluminum: Thermal conductivity about 204 W/mK (roughly 1000 times better conductivity than polymers above)

This reduction in LHC may be obtained in a number of ways, such as;

1. The exposed heat transfer and heat accumulating surfaces of the rotor areas are made of materials having low heat conductivity, as explained above;
2. The rotor may be axially divided into at least two axial rotor sections separated by an insulator layer that reduces axial thermal conductivity, e.g. axial rotor sections with high thermal conductivity separated by one or more insulating intermediate part/s made in a material having low thermal conductivity and/or separated by one or more insulating air gap/s that reduces axial thermal conductivity;
3. The rotor may be axially divided into at least two axial rotor sections in combination with 1 or 2 above.
4. The heat transfer and heat accumulating layers in a foil with relatively high thermal conductivity used to wind a rotor may include a plurality of circumferentially extending hindering sub areas with low thermal conductivity, that hinder LHC, wherein the sub areas has a length 1 (see FIG. 21) in the circumferential direction that is a fraction of the circumference C of the rotor (e.g., 5 L<C), and wherein 1 substantially exceeds the axial width W of the sub areas. In one embodiment, at least 1>10 W. In another embodiment, at least 1>50 W. The sub areas are applied in several axial positions such that a first sub area extends circumferentially in an overlapping manner in regard to a neighboring circumferentially extending sub area, further reducing LHC in the heat storing layers.

Furthermore, efficiency may be improved by also using cross-sectionals forms of the channels of the rotor that improve heat transfer from the air to the heat transfer and heat accumulating surfaces, which surprisingly has been found to be especially advantageous when using materials with low thermal conductivity, e.g. the entire rotor matrix can be made from channels with a hexagonal shape. In one embodiment, with channels with a hexagonal shape in combination with the use of a thermoformable polymer that may facilitate cost-efficient production;

According to one aspect the disclosure ill general terms relates a heat transfer assembly for a rotary regenerative heat exchanger comprising;

a rotor arranged between at least two separated fluid flow passages passing flow axially through the rotor, each flow passage connected to a sector part of the rotor, a plurality of channels in the rotor for the flow of fluid through the channels, each of the channels enclosed by heat transfer and heat accumulating surfaces in the rotor;

the heat transfer and heat accumulating surfaces in the axial direction of the rotor being at least in part made in a material, providing an average axial thermal conductivity less than 100 W/mK. In one embodiment, the average axial thermal conductivity is less than 50. In another embodiment the average axial thermal conductivity is less than 10, thus reducing the Longitudinal Heat Conductivity (LHC), wherein the average axial thermal conductivity may be obtained by dividing the rotor into a plurality (n) of axial heat paths (x,y) having different axial thermal conductivity and summing up the total thermal conductivity of all heat paths and dividing the total thermal conductivity by the number of heat paths.

the heat transfer and heat accumulating surfaces are (at least in part) made in a heat absorbent material with a high thermal conductivity, i.e. above 10 W/mK or even above 100 W/mK, wherein the heat transfer and heat accumulating surfaces with high thermal conductivity is arranged with hindering sub areas having a low thermal conductivity, thereby limiting LHC in the axial extension.

The object of the disclosure may be achieved by using a material of the heat transfer and heat accumulating surfaces that has thermal conductivity less than 100 W/mK. In one embodiment, less than 50. In another embodiment, less than 10.

In an embodiment of this latter approach a solution may be seen as corresponding to an increase of at least 50% of the total length of the average of all heat flow paths to move axially from one axial end of the rotor to the other end of the rotor compared to a rotor without any hindering sub areas in the axial direction. Hence, in the broadest sense may the heat transfer and heat accumulating surfaces of the channels be made in one single type of material with low thermal conductivity less than 100 W/mK, e.g., in polymer material and/or in any high thermal conductivity material, above 100 W/mK, wherein with hindering sub areas reduces the axial thermal conductivity.

The disclosed heat transfer assembly have local areas of the heat transfer and heat accumulating surfaces in the axial direction of the rotor with a low thermal conductivity, wherein each local area has a width W (see FIG. 21) that covers less than 5% of the total axial length L of the rotor, and wherein each local area is preceded or followed in the axial direction with heat transfer and heat accumulating surfaces with a high thermal conductivity. Small narrow slits of low thermal conductivity, such as air gaps of polymer filled slits, effectively prevents LHC in the rotor.

In one embodiment, the disclosure may comprise a plurality of rotor sections, wherein at least the heat transfer and heat accumulating surfaces of one section may have a high thermal conductivity that is continuous over the circumference of the rotor section but with an axial length being a fraction of the total axial length of the rotor. A gap with low thermal conductivity is located after the section and with an axial length being a fraction of the section reducing the LHC in the rotor. The rotor may thus in the simplest form be made in two identical axial rotor sections with same high thermal conductivity, and with an insulating gap between these axial rotor sections. By using this concept further, the disclosed rotor may have several successive layers of heat transfer and heat accumulating surfaces with high and low thermal conductivity arranged in the axial direction of the rotor.

In a preferred embodiment, the rotor is made only in a heat absorbent material with a low thermal conductivity. That the temperature efficiency is increased by using low thermal conductivity in rotor is somewhat surprising. It has surprisingly been seen that the temperature efficiency of the rotor significantly may exceed that of an aluminum rotor, e.g. by producing the rotor by means of tubular pipes pressed together and arranged to extend axially in the rotor wherein tubular pipes are made in a material with low thermal conductivity, e.g. a thermal polymer Especially good results may be obtained if the tubular pipes have a cylindric, hexagonal or square cross section, since the polymer provides low LHC and the near round cross-sectional forms provide high heat transfer, thanks to large effective area.

In yet an alternative embodiment of the disclosed concept with reduced LHC the rotor may be made by winding foil material to a cylindrical rotor. This enable usage of established winding techniques for making the rotor. The foil material may include a heat storing layer of foil with high thermal conductivity provided with slits of low thermal conductivity, forming multiple circumferentially oriented strips of heat storing material separated by slits of low thermal conductivity in the rotor. In one embodiment of these wound rotors may the length of the axially neighboring slits have a length that is only a fraction of the circumference of the later formed rotor. In such embodiment are bridges formed between the strips with high thermal conductivity, increasing the structural integrity of the foil during winding of the rotor.

In a further embodiment may also the foil material include at least one flat base layer providing low LHC and a corrugated top layer of high LHC, e.g. aluminum, since it may provide a, cost-efficient; i.e. reducing manufacturing costs. The corrugated top layer may have a sinus form, a triangular form, a square form or a rectangular corrugation form or even circular form or close to circular form.

The concept with reduced LHC in the heat transfer and heat accumulating surfaces may be modified in several ways beyond the embodiment disclosed in attached figures that are described in more detail below.

BRIEF DESCRIPTION OF FIGURES

In the following the disclosure will be described in more detail with reference to the enclosed schematic drawings, wherein.

EMBODIMENTS OF THE DISCLOSURE

Figure 1:
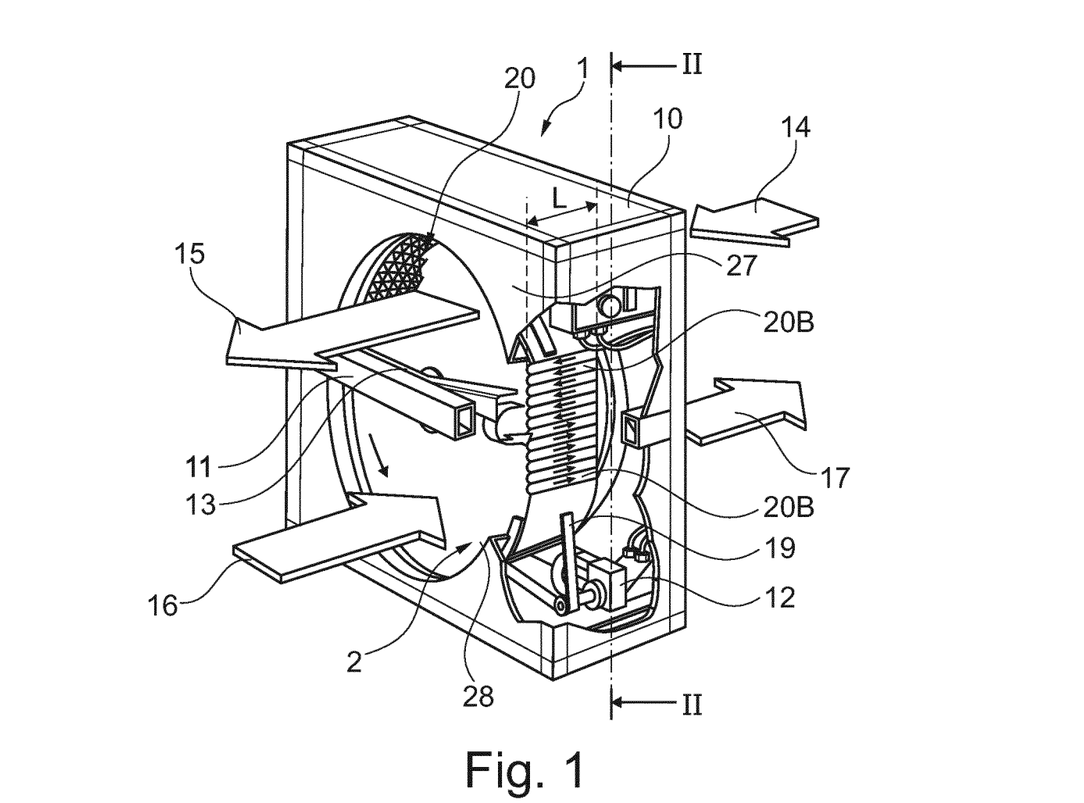
FIG. 1 shows a perspective view of heat transfer assembly for a rotary regenerative heat exchanger.

In FIG. 1 there is shown a heat transfer assembly 1 for a rotary regenerative heat exchanger. This assembly includes a housing 10 and a support frame 11, supporting a rotor 2 arranged between at least two separated fluid flow passages 14/15, 16/17. The two fluid flow passages 14/15, 16/17 comprise an inflow 14/15 having incoming fresh air, outdoor air 14 passing the rotor 2 and leaving the rotor 2 as conditioned air, supply air 15, and an outflow 16/17 having outgoing air, extract air 16 passing the rotor 2 for heat exchange and finally leaving as expelled air, exhaust air 17.

The rotor 2 is normally driven at a continuous rotational speed of about 5-20 rpm. The drive may be a motor 12 driving a belt 19 arranged around the rotor 2. The two flows 14/15, 16/17, pass counter currently through the rotor 2. Each flow passage 14/15, 16/17 passes each one of a sector part 27 and 28 respectively of the rotor 2, separated by a partition wall 13, separating the two flows in dedicated air ducts (not shown per se). The rotor 2 is built up by a plurality of channels 20 in the rotor 2 for flow of a fluid (e.g. air) through the channels 20. In the inflow sector 28 the air passes into the conditioned space via inflow channels 20A. In the outflow sector 27 the air passes out from the conditioned space via outflow channels 20B, as shown by the partly cut through part of the rotor 2 in fie 1.

Each of the channels 20 are enclosed by heat transfer and heat accumulating surfaces in the rotor 2. Each channel may have a cross sectional area in the range 0.01-0.1 $cm^2$, or even as low as 0.005 $cm^2$, which establish a very large total area of the heat absorbent surface in the rotor 2.

Figure 2:
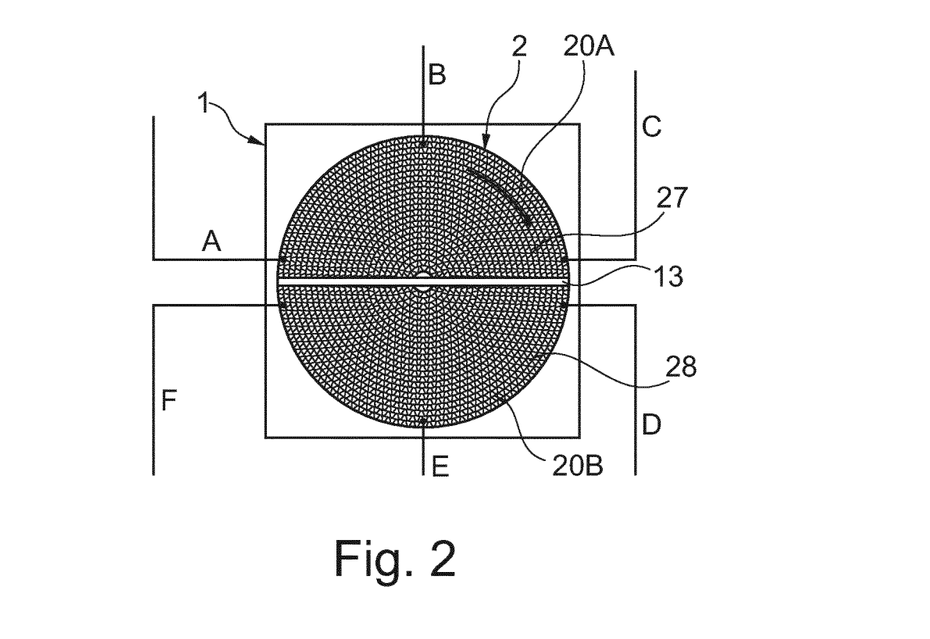
FIG. 2 shows a face view of a rotor with two sector parts (as seen from the right in FIG. 1).

As may be seen in FIG. 2 substantially the whole circular area of the rotor 2 comprises channels 20A and 20B, divided into the two sectors 27, 28, by the partition wall 13. An inflow sector 27 (upper half) with a large number of inflow channels 20A and an outflow sector 28 (lower half) with a large number of outflow channels 20A, 20B, wherein the flow of fresh air may flow in the upper sector 27 and the flow of air to be evacuated may flow in the lower sector 28 through the rotor 2.

Assuming that the rotary heat exchanger 1 is operated in cold winter climate, hot, smelly and moist extract air 16 at room temperature (about 20° C.) is ventilated through the lower sector 28, via outlet channels 20B as seen in FIG. 1, and outdoor air 14 at ambient cold temperature (about +10 to −20° C.) is fed into the upper sector 27 via inlet channels 20A, as seen in FIG. 1. This means that the heat transfer and heat accumulating surfaces of the rotor 2 in the lower sector 28 are heated by the passing air flow 16/17, and the heat transfer and heat accumulating surfaces of the rotor 2 in the upper sector 27 are chilled down by the passing air flow 14. As the rotor 2 rotates the heated channels 20B will pass into the upper sector 27 and obtain the cold air 14, to leave as a supply air 15. The chilled channels 20A of the rotor 2 will then pass into the lower sector to be filled with the hot extract air 16 heating the heat transfer and heat accumulating surfaces of the channels 20B. That heat will then be transferred to cold extract air 16 when a heated channel 20A is exposed in the inlet sector 27. This will result in heated inflow of supply air 15 and reduction of the temperature of the extract air 16 to be vented off, which saves energy for heating the incoming outdoor air 14.

Now, assuming that the rotary heat exchanger is operated in hot summer climate, moist extract air 16 at chilled room temperature (about 20° C.) is ventilated through the lower sector 28 as seen in FIG. 1, and outdoor air 14 at ambient hot temperature (about +22 to +35° C.) is fed into the upper sector part 27 as seen in FIG. 1. This means that the heat transfer and heat accumulating surfaces of the rotor 2 in the lower sector 28 are chilled down by the passing air flow. As the rotor 2 rotates this will result in a lowering of the temperature of the supply air 15 of fresh ambient air, which reduces energy consumption for air conditioning systems, maintaining the conditioned space at appropriate low temperature.

As shown in FIG. 2 the rotor 2 rotates the channels 20 past different subsequent positions A-C in the inflow sector 27. First position A, then to a second mid position B and finally position C. The channels 20 and the heat transfer and heat accumulating surfaces during the travel from position A to C successively assumes the temperature of the outdoor air 14 in the upper section 27. Accordingly, at position A there will be a large difference ΔA between the temperature $T_{14}$ of the outdoor air 14 and the temperature $T_A$ of the heat transfer and heat accumulating surfaces of the inflow channels 20A, whereas there will be a small (or no) difference ΔC between the temperature $T_{14}$ of the outdoor air 14 and the temperature $T_C$. In a similar manner, as the rotor 2 rotates the outflow channels 20B will first come to position D of the outflow section 28, then to a mid-position E and finally reach end position F, the channels and the heat transfer and heat accumulating surfaces successively will assume the temperature of the extract air 16 into the lower section 28.

Figure 3:
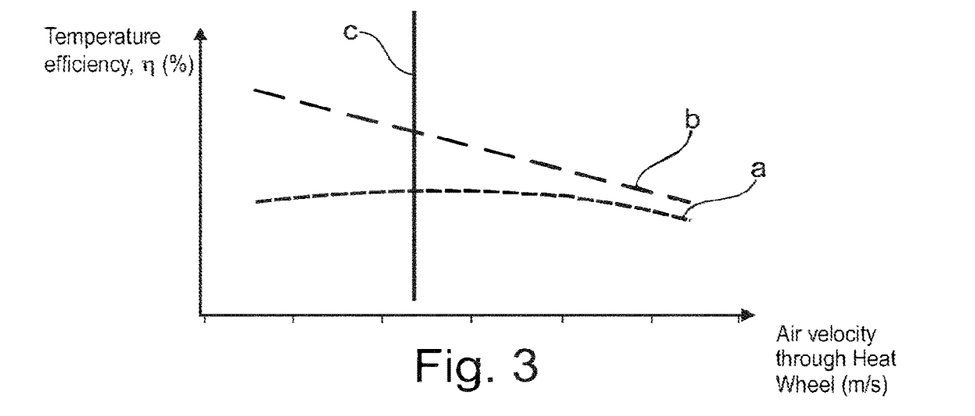
FIG. 3 shows the temperature efficiency of a rotor with aluminum heat transfer and heat accumulating surfaces.
Figure 4:
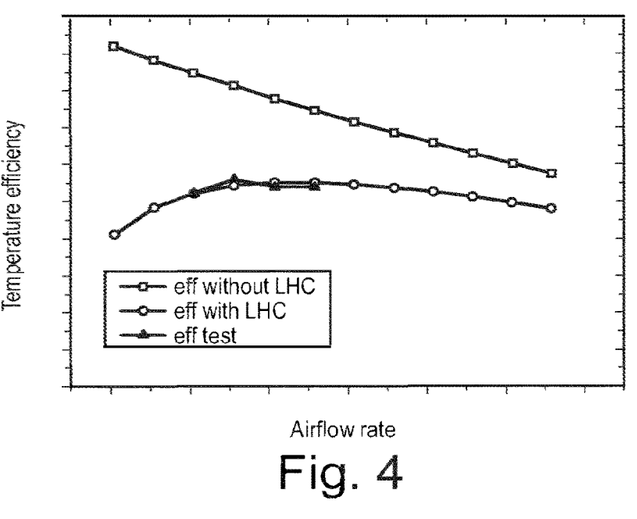
FIG. 4 shows the temperature efficiency of a rotor without LHC compared to with LHC in both calculated and after verifying tests.
Figure 5:
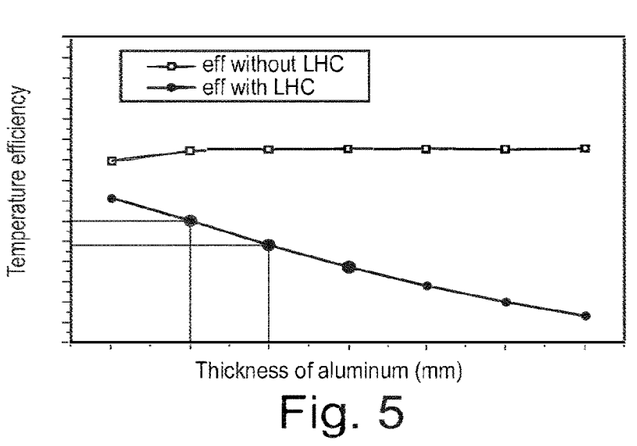
FIG. 5 shows the temperature efficiency of an aluminum rotor with or without LHC as a function of wall thickness in the heat transfer and heat accumulating surfaces.

In FIGS. 3-5 are shown the effects from LHC versus non LHC, that is the very basis for this disclosure.

In FIG. 3 is shown the typical temperature efficiency η in a rotor with aluminum heat transfer and heat accumulating surfaces, wherein the temperatures refer to what is shown in FIG. 1, e.g. $t_{14}$ refers to the temperature of incoming outdoor air 14.

$$\eta(\%)=(t_{15}-t_{14})/(t_{16}-t_{14})$$

The upper curve b) shows the theoretical temperature efficiency (η) without LHC. The lower curve a) shows the temperature efficiency (η) with LHC. The peak efficiency c is obtained at face area velocity of about 1.2 m/s. This show the considerable loss in temperature efficiency when using heat transfer and heat accumulating surfaces in aluminum with large Longitudinal Heat Conduction, i.e. MC, In FIG. 4 is instead shown the temperature efficiency that could be obtained without LHC (the upper curve with plotted squares). This upper curve should be compared with the calculated temperature efficiency with LHC (the curve with plotted non-filled circles), which latter heat efficiency with LHC has been verified in tests (the curve with plotted filled triangles). If no LHC could be implemented, then an efficiency increase of about 25% (70>95%) may be obtained.

In FIG. 5 is the temperature efficiency of an aluminum rotor with or without LHC as a function of wall thickness in the heat transfer and heat accumulating surfaces. Assuming now that the aluminum with its high thermal conductivity could be made such that this thermal conductivity is kept in the orthogonal direction of the by-passing flow of air but may be given a low thermal conductivity in the direction of the axial flow of air. Then the upper curve shows the high and steady temperature efficiency that could be obtained if such aluminum rotor has no LHC. And this high efficiency is kept at increasing wall thickness of the heat transfer and heat accumulating surfaces. The lower curve on the other hand show how the temperature efficiency declines almost proportional to wall thickness if the typical LHC in aluminum is at hand.

Figure 6:
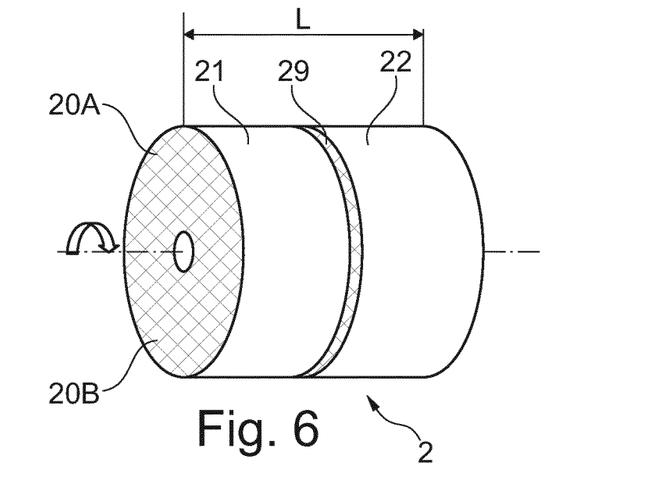
FIG. 6 shows a perspective view of a principle embodiment to obtain reduced LHC with a first axial rotor section in aluminum and a second axial rotor section in aluminum and with an insulating layer therebetween.

In FIG. 6 is shown a first basic embodiment of a rotor designed with the intention to decrease LHC. The rotor is divided into a first axial rotor section 21 and a second axial rotor section 22, both with same heat transfer and heat accumulating surfaces with high thermal conductivity, e.g. made in aluminum. These two axial parts 21 and 22 are separated by an insulating gap 29 made in a material with low thermal conductivity e.g. plastic but equipped with holes in the insulating layer connecting channels from first axial part to channels in the second axial part. In another version (not shown) of a two-stage rotor the two axial parts 21 and 22 could simply be located with an air gap 29 between end faces, such air gap efficiently reducing the LHC even further.

Figure 7:
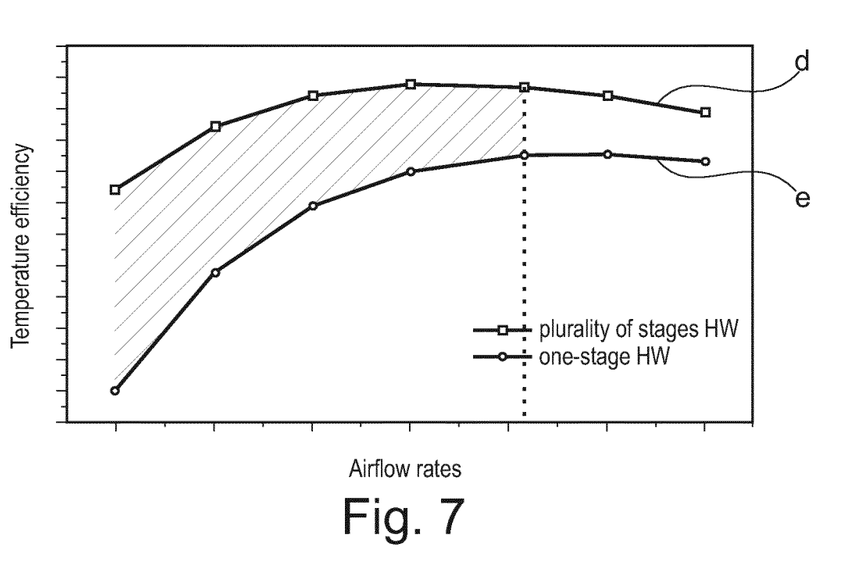
FIG. 7 shows the improved temperature efficiency of the embodiment shown in FIG. 6.

In FIG. 7 is shown the improvement in temperature efficiency if a single stage aluminum rotor is modified to a multi-stage aluminum rotor with an insulating layer in-between. This successive improvement in temperature efficiency may be obtained if the aluminum rotor is further modified into 3, 4, 5 or more stages.

Figure 8:
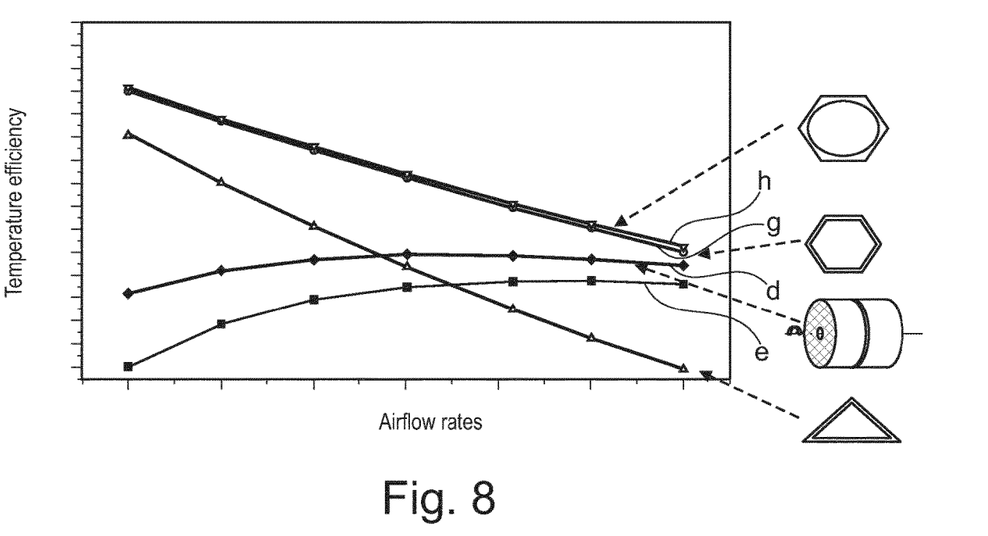
FIG. 8 shows the temperature efficiency when using different profiles and materials for the channels in the rotor as well as a two-stage axial division of the rotor.

FIG. 8 is showing how the temperature efficiency may be improved with different designs in the rotor all considering LHC reduction.

Curve e shows the reference rotor with aluminum in rotor 2, one stage, with high LHC, according to prior art. In curve d is shown the improvement that may be obtained with a design according to the principle shown of FIG. 6, with a plurality of axial parts of an aluminum rotor and one or more insulating layers in-between in order to reduce LHC.

Curves g and h show alternative channel designs (se figures in the right-hand part of FIG. 8) with a material in the entire rotor 2 (one stage) with low heat conductivity such as polymers. However, the test results shown in curves h and g with hexagonal and circular inner shape, respectively, of the channels in low LHC polymer are better than the reference in the entire air flow range. And the design with a circular inner surface of the channel in a hexagonal tube element (curve h), is slightly better than having a hexagonal external and internal shape of the tube element. These tests show that drastic improvements may be obtained when using a one stage rotor with tube elements with a hexagonal or circular shape and made in a material with low heat conductivity, all reducing the LHC.

Figure 9:
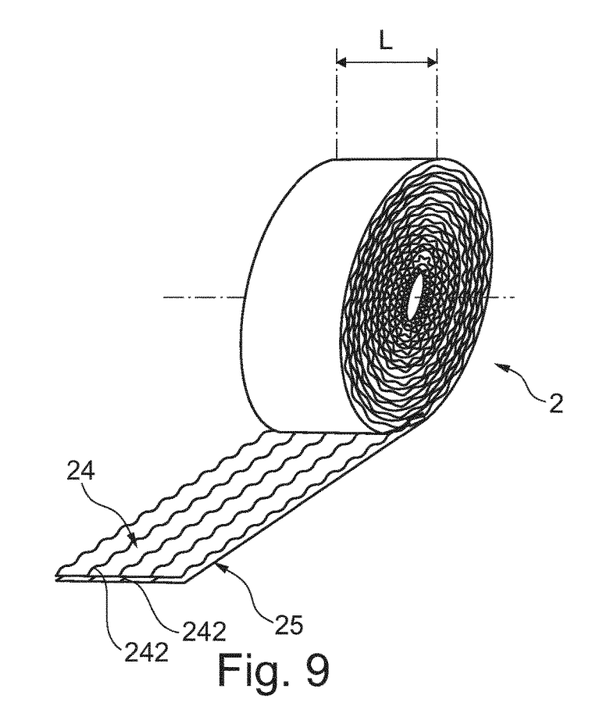
FIG. 9 shows the principle build-up when winding a foil to form a rotor.
Figure 10:
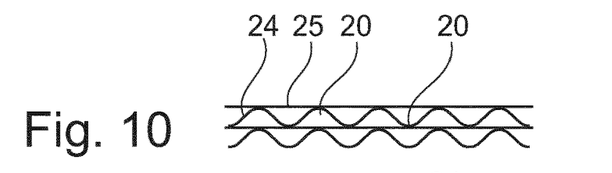
FIG. 10 shows the principal build-up of layers to form channels in the rotor, using a sinus shaped foil.

In FIG. 9 is shown the well-known prior art technique used when forming a heat exchange rotor with channels by winding a foil. The rotor 2 is formed by winding a rotor foil 24/25, that includes a flat base layer 25 with a corrugated top layer 24 attached on the flat base layer 25. As shown in FIG. 10 the individual channels 20 may be formed between two adjacent flat layers 25 by the corrugated layer 24 arranged therebetween. A large variety of sheet materials, e.g. metal, polymer or laminated foil may be used for the flat base layer 25 and the top layer 24, independent of each other. In a preferred embodiment it is made use of a laminated foil 24A (see FIGS. 18-19. It is to be understood that the use of ref. 24A, does not indicate any limitation regarding use in a specific layer, i.e. but as is evident for the skilled person a laminated foil 24A may be used for the corrugated layer 24 and/or the flat layer 25). Most preferred the same foil laminated 24A is used in the flat base layer 24 as in the top layer 25, As shown in FIGS. 19 and 20 such a laminated foil 24A may have at least one or a plurality of continuous slits 242.

Below various appropriate designs of the corrugated top layer 24 will be discussed. FIGS. 10, 10A-13 show differing forms of the rotor foil 24/25 that may be formed by winding as shown in FIG. 9.

FIG. 10 shows a common sinusoid channel design.

Figure 10A:
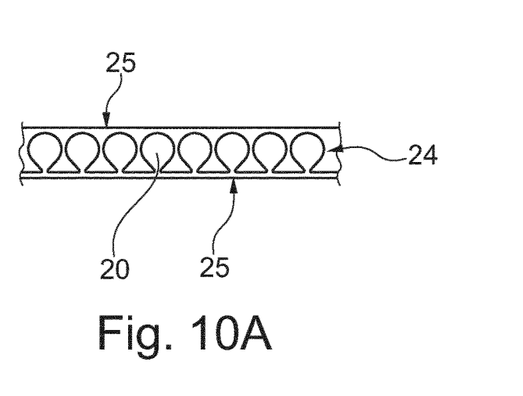
FIG. 10A shows an alternative build-up of channels in the rotor using, a circular shaped foil.

FIG. 10A shows a circular channel design.

Figure 11:
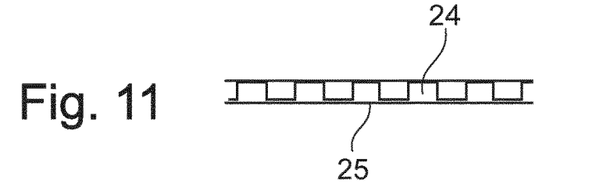
FIG. 11 shows an alternative build-up of channels in the rotor using a square shaped foil.

FIG. 11 shows an alternative where square shaped channels 20 are formed by arranging a corrugated layer 24 with square corrugations between two flat layers 25.

Figure 12:
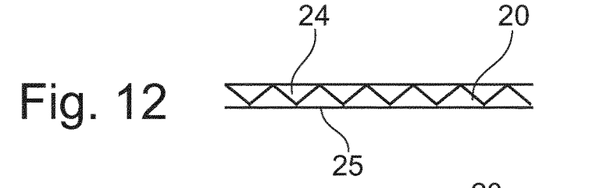
FIG. 12 shows an alternative build-up of channels in the rotor with triangular channels.
Figure 13:
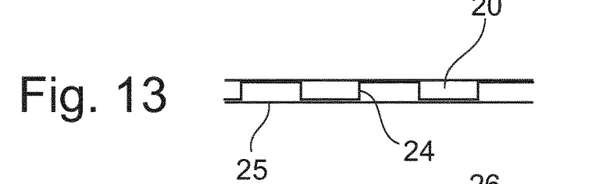
FIG. 13 show an alternative build-up of channels in the rotor with rectangular channels.

FIG. 12 shows an alternative where triangular shaped channels 20 are formed by arranging a corrugated layer 24 with triangular corrugations between two flat layers 25, and FIG. 13 shows an alternative with a corrugated layer forming rectangles.

FIGS. 14-17 show differing forms of the channels 20 in the rotor, where the rotor may be made by extrusion of or stacking of tube elements 26 with low heat conductivity e.g. made in polymer, and thus low LHC, closely together.

Figure 14:
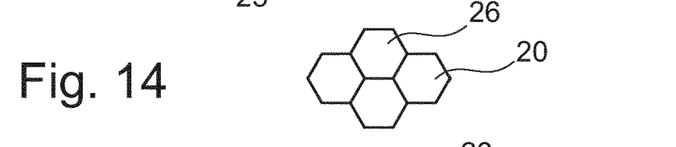
FIG. 14 shows a build-up of channels in the rotor with hexagonal channel.

In FIG. 14 is shown an alternative where hexagonal tube elements 26 may be stacked closely together and thus form the channels 20 in the rotor.

Figure 15:
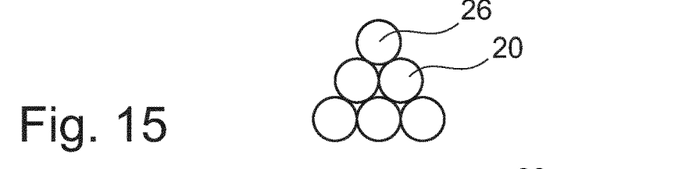
FIG. 15 shows a build-up of channels in the rotor with circular channel elements.

In FIG. 15 is shown an alternative where circular tube elements 26 may be stacked closely together and thus form the channels 20 in the rotor.

Figure 16:
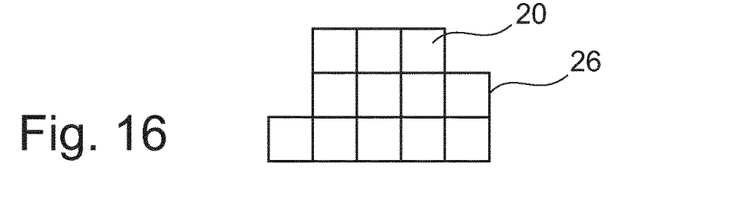
FIG. 16 shows a build-up of channels in the rotor with square channel elements.

In FIG. 16 is shown an alternative where square tube elements 26 may be stacked closely together and thus form the channels 20 in the rotor.

Figure 17:
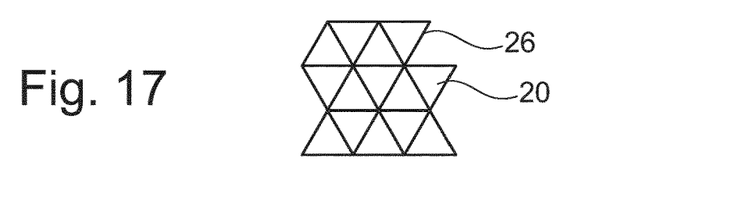
FIG. 17 shows a build-up of channels in the rotor with triangular channel elements.
Figure 18:
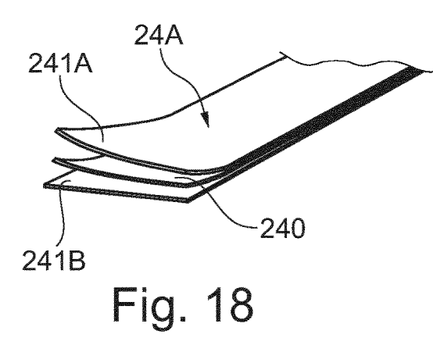
FIG. 18 shows a principal build-up of an embodiment of a foil member used when winding a rotor from the foil.
Figure 19:
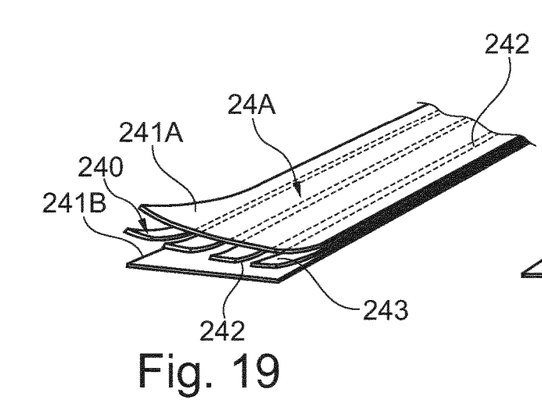
FIG. 19 shows an embodiment of the disclosure with reduced LHC in the foil member.
Figure 20:
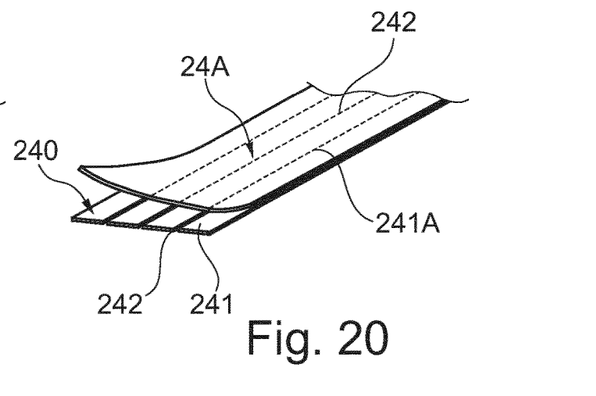
FIG. 20 shows an alternative embodiment of the disclosure with reduced LHC in the foil member.
Figure 21:
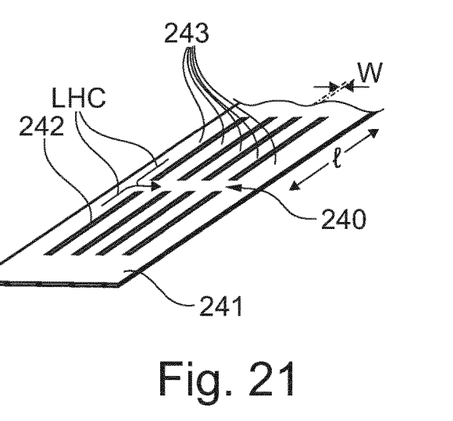
FIG. 21 shows in detail a heat storing layer in the foil according to an embodiment of the disclosure with reduced LHC in the foil member.
Figure 22:
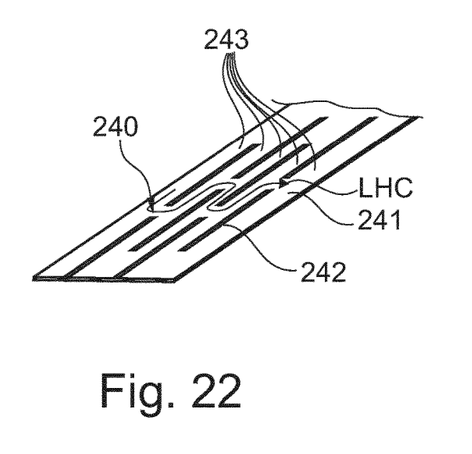
FIG. 22 shows an alternative of the heat storing layer.
Figure 23:
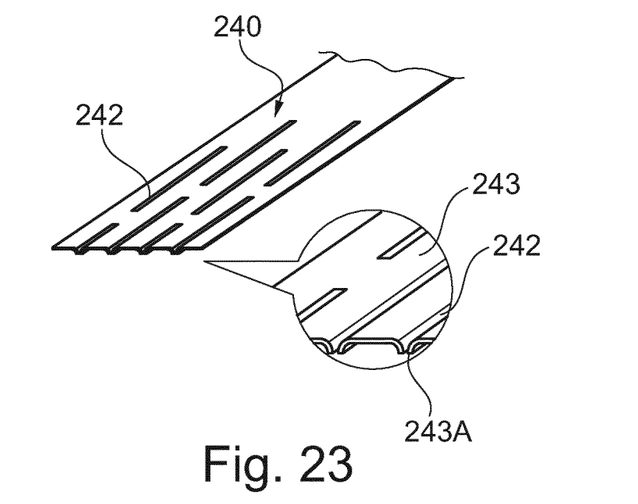
FIGS. 23 and 23A show other alternatives of the heat storing layer.

In FIG. 17 is shown an alternative where triangular tube elements 26 may be stacked closely together and thus form the channels 20 in the rotor, When using the technique as shown in FIG. 9, winding the rotor 2 from a rotor foil 24/25 producing any of the channels 20 as shown in FIGS. 10-13, the disclosed concept with reduced LHC may be implemented by a laminated foil 24A as shown in FIGS. 18-20, wherein to form the corrugated layer 24, a treated metal layer/sheet 240 (e.g. Alu or steel) as shown in FIGS. 21-23, may be used to provide formability.

In FIG. 18 it is shown that the laminated foil 24A comprises a central alu foil 240 (to provide formability) and two polymer sheets 241A, 241B providing the heat transfer and heat accumulating surfaces to reduce LHC, wherein the alu foil sheet 240 may be treated to provide for LHC in the alu foil sheet 240, to be more or less neglectable. In FIG. 19 there is shown a modification in order to possibly reduce the LHC even more, by means of having the metal sheet 240, provided with slits 242, in this case providing gaps, e.g. with air which effectively will reduce any LHC that otherwise may occur in the metal sheet 240 (e.g. if thicker than in FIG. 18). These slits 242 may be continuous and held in place by one upper polymer sheet 241A (as may be seen as indicated in FIG. 20), or two polymer sheets 241A, 241B, one upper and lower, respectively (as may be seen as indicated in FIG. 19).

In FIGS. 21 and 22 itis shown that the foil 24, 25 may be arranged without any polymer sheet but merely using slits 242 to reduce the LHC, i.e. by providing an increased average flow path to reduce the LHC. Further FIGS. 21 and 22 also show that the length 1 of the slits 242 is substantially longer than width W of the slits 242, In one embodiment, the sub areas, here each slit 242, has a length 1 in the circumferential direction of the rotor 2 that is a fraction of the circumference C of the rotor 2 (e.g., 5 L<C), and wherein 1 substantially exceeds the axial width W of the sub areas. In one embodiment, at least 1>10 W. In another embodiment, at least 1>50 W. In still another embodiment, 1>100 W.

In FIG. 22 is shown a modification of the design of FIG. 21, where the slits 242 are arranged offset to neighboring slits, thus extending the distance for axial heat conduction as no straight axial heat path exists for LHC between neighboring areas 243.

Figure 23A:
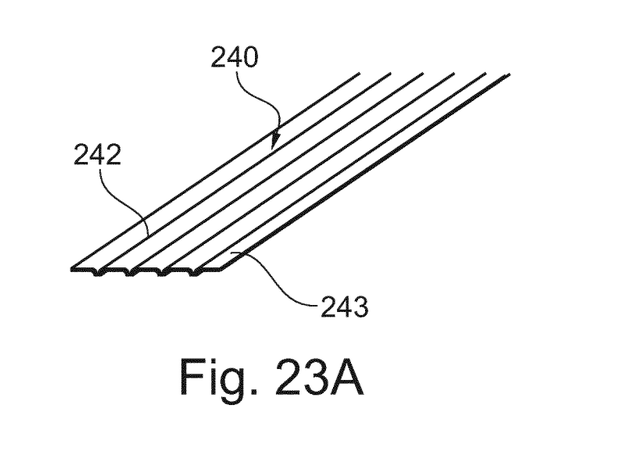

In FIGS. 23 and 23A there is shown an alternative embodiment when using slits 242 in the metal sheet 240, wherein the slits 242 are punched such that the edges 243A of the material extend along the slits 242 protruding transversally on one side of the metal sheet 240. The protruding edges 243A will extend transversally in relation to the flow of air and thereby cause turbulence that may improve heat transfer between the air and the rotor foil 24. In FIG. 23A it is shown that the slits 242 may be continuous, for example, by use of a top polymer sheet (not shown, but same as 241A in FIG. 20) to obtain sufficient strength. In all embodiments shown in FIGS. 20-23 the slits 242 may be made as an air gap. Alternatively, the slits 242 may be filled with a material with low heat conductivity such as a polymer.

Further, the Nusselt number (NU) may be of essence in some applications according to the disclosure, especially when having channel materials with low lambda. In heat transfer at a boundary (surface) within a fluid (here normally air), the Nusselt number is the ratio of convective to conductive heat transfer across (normal to) the boundary and varies with the shape and character of the boundary surfaces, i.e. the cross sectional shape of the channel 20 and impact of surface material 24A/24B, 25. It has been concluded that when using material having a lambda below 100, the Nusselt number ($NU_{H2}$) should be above 2. In one embodiment, the $NU_{H2}$ is above 3, to achieve efficiencies on an extra high level. If lambda is very low, i.e. below 15 there is a desire to have a Nusselt number above 3, regarding $NU_{H2}$, which relates to a specific measurement of the Nusselt number especially adapted for materials where lambda is very low. Accordingly, when using materials with low lambda it has been found that the shape/design of the flow channels may have significant impact on the efficiency and that the Nusselt number may assist in choosing appropriate shape/s, basically assisting in choosing a shape that enables good heat transfer to occur along substantial parts of the perimeter of each channel.

The disclosure may be modified in many ways without departing from the concept as shown in figures.

The invention claimed is:

1. A heat transfer assembly for transferring heat from a first flowing fluid to a second flowing fluid, the assembly comprising:
   a heat regenerating rotor disposed to rotate about a longitudinal axis extending parallel to longitudinal directions of flow of provided first and second flowing fluids, the rotor having a plurality of fluid-confining flow-through channels that each rotate to receive respective portions of the flows of the first and then of the second provided flowing fluids as the rotor rotates and to each confine in the respective channel the received respective portion as its flowing-through channel fluid;
   wherein each flow-through channel has a fluid-confining channel boundary comprised of a first heat transfer layer thermally coupled to a corresponding first heat accumulating layer, the first heat transfer layer and the first heat accumulating layer being comprised of respective different materials, the first heat transfer layer being disposed to contact the flowing-through channel fluid of its respective channel; and
   wherein the respective first heat accumulating layer of each flow-through channel has alternating regions, as successively encountered in the longitudinal direction, of relatively higher thermal conductivity and of comparatively and substantially lower thermal conductivity such that conduction of heat in the longitudinal direction through the channel boundary of each flow-through channel is hindered by presence in the first heat accumulating layer of the regions of comparatively and substantially lower thermal conductivity.

2. The heat transfer assembly of claim 1 wherein the successively encountered alternating regions respectively comprise a first region having a relatively large cross sectional area of material of the relatively higher thermal conductivity and a second region having a comparatively smaller or zero cross sectional area of the material.

3. The heat transfer assembly of claim 2 wherein the second region is part of a continuous slit that extends in a circumferential direction, the circumferential direction being orthogonal to the longitudinal direction, whereby the cross sectional area of the material of the relatively higher thermal conductivity in the second region is zero.

4. The heat transfer assembly of claim 2 wherein channel boundary of each flow-through channel has an average axial heat conductivity (LHC) of less than 100 W/mK as determined along the longitudinal direction.

5. The heat transfer assembly of claim 2 wherein the average axial heat conductivity (LHC) is less than 10 W/mK.

6. The heat transfer assembly of claim 5 wherein the material of the relatively higher thermal conductivity of the first heat accumulating layer has a heat conductivity greater than 100 W/mK.

7. The heat transfer assembly of claim 2 wherein the material of the relatively higher thermal conductivity includes a deformable metal.

8. The heat transfer assembly of claim 7 wherein the deformable metal includes aluminum.

9. The heat transfer assembly of claim 7 wherein the first heat transfer layer includes a polymer.

10. The heat transfer assembly of claim 9 wherein the polymer is a thermoformed polymer.

11. The heat transfer assembly of claim 1 wherein the channel boundary that is comprised of the first heat transfer layer and the corresponding first heat accumulating layer is part of a corrugated laminated foil.

12. The heat transfer assembly of claim 11 wherein the material of the relatively higher thermal conductivity includes deformable metal that is deformed to define corrugations of the corrugated laminated foil.

13. The heat transfer assembly of claim 12 wherein the channel boundary of each channel further includes a second heat transfer layer that combines with the first heat transfer layer to provide confinement of the flowing-through channel fluid in the respective flow-through channel, the second heat transfer layer being disposed to contact the flowing-through channel fluid in the respective flow-through channel.

14. The heat transfer assembly of claim 13 wherein the first and second heat transfer layer are each composed of a non-hygroscopic material.

15. The heat transfer assembly of claim 13 wherein the second heat transfer layer is part of a non-corrugated foil wound in a circumferential direction that is orthogonal to the longitudinal direction.

16. The heat transfer assembly of claim 15 wherein the non-corrugated foil further includes a second heat accumulating layer that defines part of the fluid-confining channel boundary of each flow-through channel.

17. The heat transfer assembly of claim 16 wherein the non-corrugated foil further includes a third heat transfer layer disposed on a side of the second heat accumulating layer that is opposite to where the second heat transfer layer is disposed, thereby defining the non-corrugated foil as having three layers.

18. The heat transfer assembly of claim 17 wherein the corrugated foil further includes a fourth heat transfer layer disposed on a side of the first heat accumulating layer that is opposite to where the first heat transfer layer is disposed, thereby defining the corrugated foil as having three layers.

19. A plurality of foils for forming a heat regenerating rotor structured to rotate about a longitudinal axis extending parallel to longitudinal directions of flow of provided first and second flowing fluids, the rotor being structured to have a plurality of fluid-confining flow-through channels that each can rotate to receive respective portions of the flows of the first and then of the second provided flowing fluids as the rotor rotates and to each confine in the respective channel the received respective portion as its flowing-through channel fluid;
   wherein the flow-through channels are defined by a spiral winding of the plurality of foils in a circumferential direction that is orthogonal to the longitudinal axis;
   wherein each foil includes a heat transfer layer arranged to interface with the respective fluid-confining flow-through channels formed in part by that foil and each foil includes a heat accumulating layer thermally coupled to the heat transfer layer and arranged to store heat transferred thereto by way of the heat transfer layer;
   wherein the heat accumulating layer of at least one of the foils has alternating regions, as successively encountered in the longitudinal direction, of relatively higher thermal conductivity and of comparatively and substantially lower thermal conductivity such that conduction of heat in the longitudinal direction through channel boundaries of each of the flow-through channels defined by the at least one of the foils is hindered by presence in the respective heat accumulating layer of the regions of comparatively and substantially lower thermal conductivity.

\* \* \* \* \*